Nov. 3, 1942.   J. A. HUTCHESON   2,300,926
VIBRATION FATIGUE APPARATUS
Filed Jan. 4, 1939   2 Sheets-Sheet 1
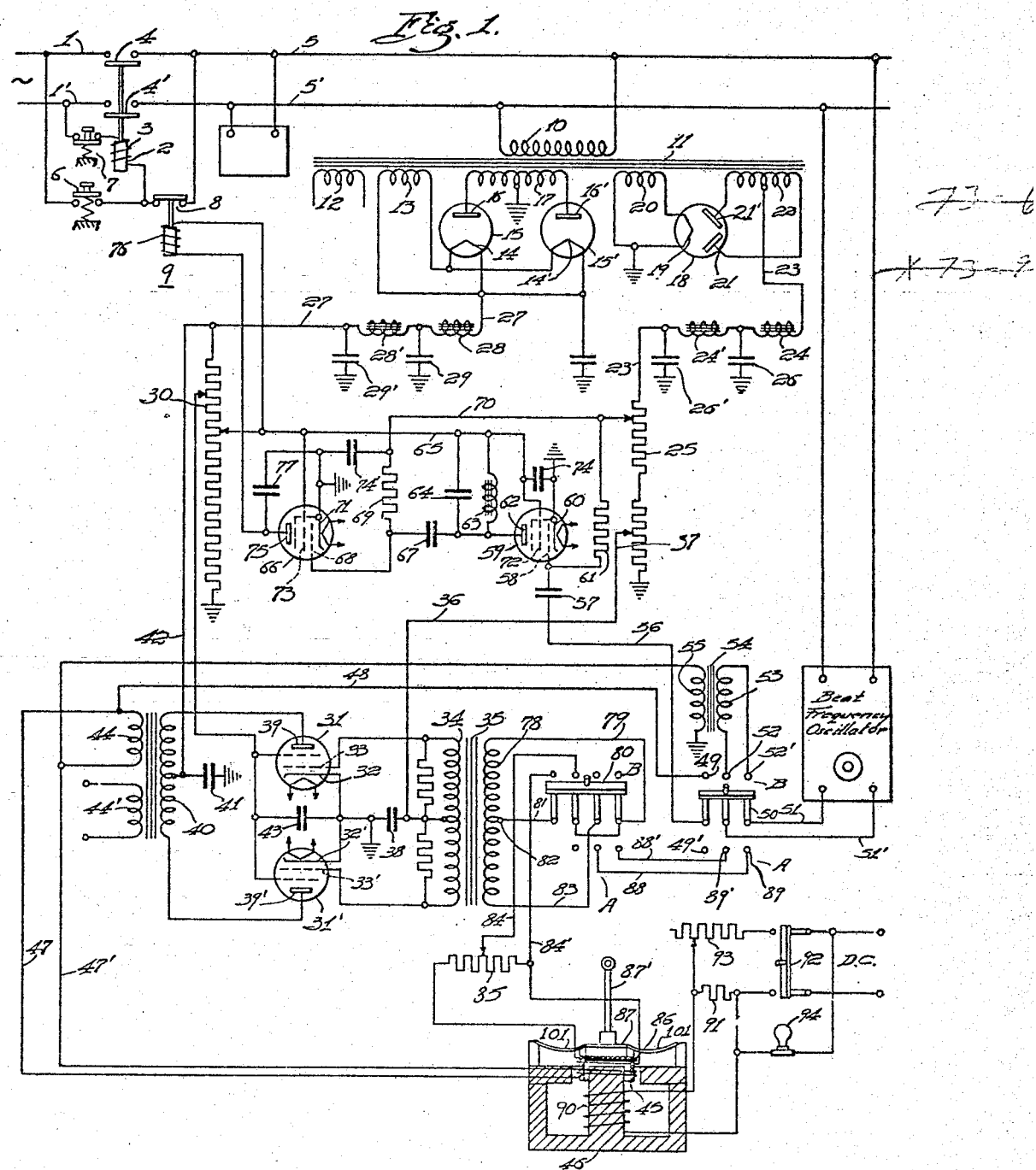
WITNESSES:
INVENTOR
John A. Hutcheson.
BY
ATTORNEY

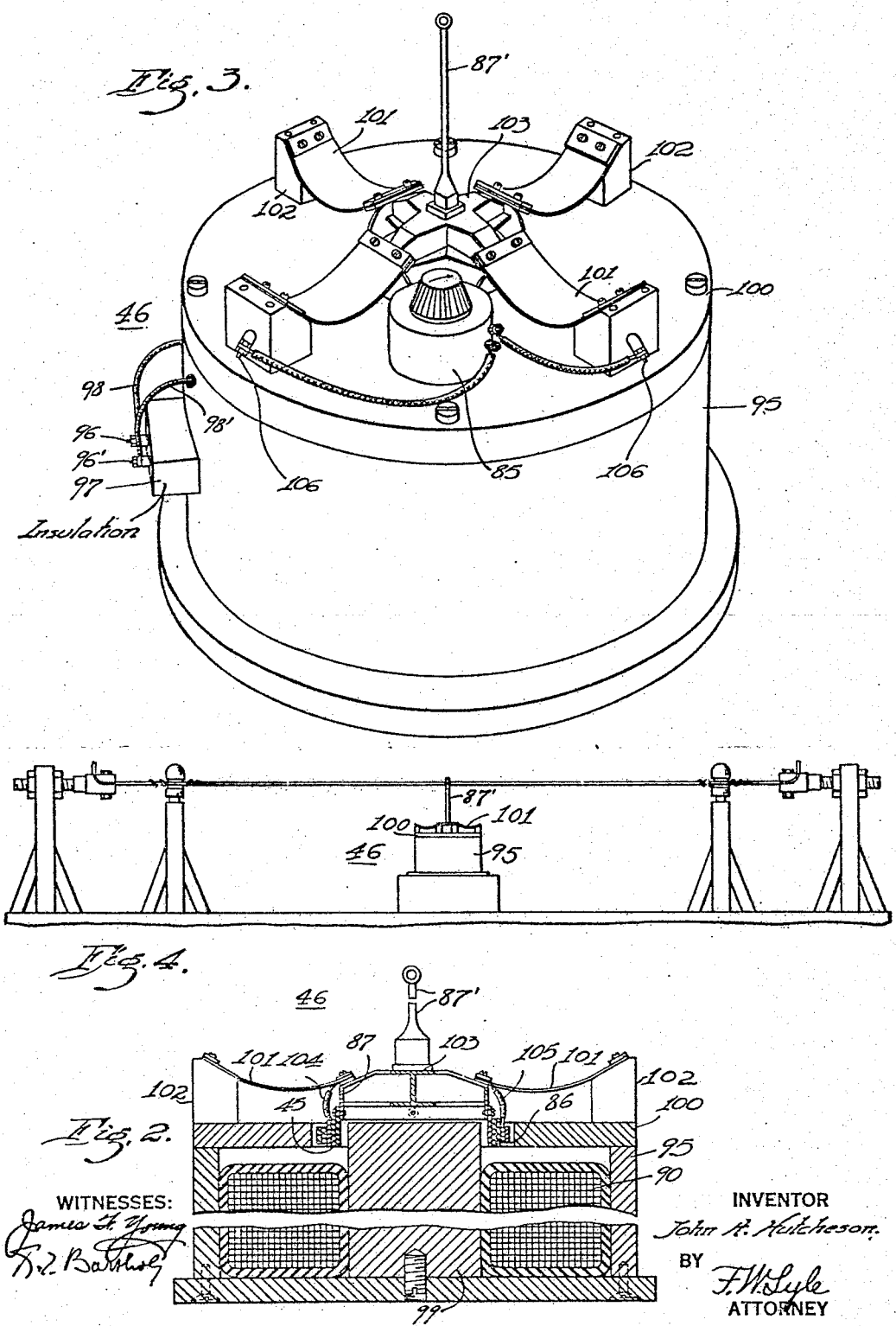

Patented Nov. 3, 1942

2,300,926

UNITED STATES PATENT OFFICE 2,300,926

VIBRATION FATIGUE APPARATUS

John A. Hutcheson, Catonsville, Md., assignor to Westinghouse Electric & Manufacturing Company, East Pittsburgh, Pa., a corporation of Pennsylvania Application January 4, 1939, Serial No. 249,259

2 Claims. (Cl. 73—51)

This invention relates to methods and apparatus for testing the physical properties of materials, and more particularly to testing of fatigue under vibratory tension.

The primary object of this invention is the provision of efficient yet simple coordination of means for vibrating materials or mechanical systems over a wide range of frequencies, in order to produce therein artificially, within a relatively short time, mechanical stresses to which such materials or systems may be exposed under operating conditions in their intended fields.

Fatigue tests of different materials or mechanical assemblies composed thereof are difficult to perform, requiring considerable time and troublesome apparatus. Heretofore, such tests were generally performed by machines which produced the required stresses in a specimen by purely mechanical power transmissions at an arbitrary rate, the frequency thereof being limited to a narrow range due to the mechanical inertia of the component parts. Especially in testing vibratory tensions, the natural periodicity of vibration of the specimen under test could not be accomplished within the narrow frequency range of such apparatus.

A particular feature of the present invention resides in the wide frequency range of the apparatus which is progressively adjustable whereby the natural vibration frequency of the specimen under test may easily be determined, and furthermore vibration at this desired frequency automatically maintained at the proper amplitude.

In conducting fatigue tests which usually must run for a considerable period of time, it is extremely desirable to be able to inspect the specimen under tests at the critical period just before its physical structure is disrupted at a time when changes take place therein which ultimately will cause its failure.

A salient feature of the present invention is that means are provided for automatically stopping the operation of the apparatus at a desired and predetermined phase in the operating cycle when certain changes in the object under test are indicative to ensuing failure. In this manner, the object subjected to test can be observed in order to determine the physical changes prior to such ultimate physical destruction which often obliterates the marks of the incipient cause producing it.

The apparatus in accordance with the present invention comprises electro-mechanical means for producing vibratory tension in materials to be tested together with means for maintaining the tension at a frequency rate corresponding to the natural frequency of the material, and means which respond to any deviation from the natural frequency and operates automatically to stop the application of further vibratory tension.

Further objects and advantages will be apparent from the following description of the invention, particularly pointed out in the appended claims, and taken in connection with the accompanying drawings, in which:

Figure 1 is a schematic circuit diagram of the apparatus;

Fig. 2 is a cross-sectional view showing the vibration producing motor;

Fig. 3 is a perspective view of the motor shown in Fig. 1; and

Fig. 4 is an illustration of one application of the vibration motor in testing the fatigue of wires such as used for overhead electrical conductors.

Referring to Fig. 1, an alternating-current supply line 1 and 1', disrupted by a circuit breaker 2 having winding 3 and contacts 4 and 4', is connected by means of conductors 5 and 5' to the various components of the apparatus. The circuit breaker 2 has its winding 3 connected in such manner that upon completion of the circuit through the "start" button 6 it is energized from the power supply line and remains in the energized position until the circuit is broken by either the "stop" button 7 or the contacts 8 of the relay 9. The power supply line conductors 5 and 5' are connected to the primary winding 10 of the power transformer 11 and to the energizing circuit of a beat frequency oscillator diagrammatically represented by a conventional square. The power transformer 11 has a number of secondary windings, of which 12 supplies the required potential for the filaments of the various tubes utilized in the apparatus. The winding 13 supplies voltage to the filaments 14 and 14' of the rectifier tubes 15 and 15' connected in full-wave operation, the anodes 16 and 16' thereof being connected to the high potential secondary winding 17 of the power transformer 11, which is center tapped to ground of the system. A second rectifier tube 18 in full-wave operation has its filament 19 connected to another secondary winding 20 of the power transformer 11, the anodes 21 and 21' being connected to the secondary winding 22 thereof. The midpoint of the secondary winding 22 is connected by means of conductor 23 in series with filter reactors 24 and 24' through one terminal of the voltage divider resistor 25, the other terminal of which is connected to ground. Completing the circuit to the rectifier tube 18, the filament 19 thereof is also grounded. Condensers 26 and 26' connected to the reactors 24 and 24' and ground complete the filter circuit for the rectifier 18. Similarly, the filaments 14 and 14' connect by means of conductor 27 through filter reactors 28 and 28', bypassed by condensers 29 and 29' to one terminal of a voltage dividing resistor 30, the other terminal of which is grounded.

The rectifier systems herein described furnish the operating potentials for the anodes and grids of the tubes utilized. The potential across the resistor 30 will be increased in the positive direction from the grounded terminal thereof, whereas across the resistor 25 this condition is reversed and the potential will be more negative with respect to ground.

The main components of the apparatus comprise a beat frequency oscillator, formerly mentioned which is of the type that can be varied in frequency output in the audio frequency range from approximately 10 to 10,000 cycles, a power amplifier, which can be excited either from the oscillator or from another source, and a frequency selective circuit which actuates the relay 9.

The power amplifier consists of a pair of power amplifier tubes 31 and 31' connected in push-pull operation. The input circuit between interconnected and grounded cathodes 32 and 32' and grids 33 and 33', respectively, comprises the divided portions of winding 34 of the input transformer 35, the center tap of the winding 34 being connected by conductor 36 to a suitable tap 37 of the voltage divider 25. The bypass condenser 38 between the center tap of the winding 34 and ground provides a low impedance of audio frequency currents to the cathodes 32 and 32'.

In the output circuit of the amplifier, the anodes 39 and 39' are connected to the output transformer winding 40, the center tap of which bypassed by condenser 41 is connected by means of conductor 42 to a suitable tap of the voltage divider 30. The power amplifier tubes shown here are of the type known as output beam tubes, having each also a screen electrode; these screen electrodes are connected together and also to the resistor 30. The screen electrodes are bypassed by condenser 43. The output transformer is shown having two secondary windings 44 and 44'. One of these windings 44 is connected to the armature winding 45 of the vibration motor 46 by means of conductors 47 and 47'. The secondary winding 44' is not connected anywhere in the system, and is for the purpose to supply energy to a different type of vibration motor than is shown here.

One terminal of the secondary winding 44 is connected through conductor 48 to contact 49 of the switch 50. The latter is of the three-pole, double-throw type which in one position connects the output of the beat frequency oscillator through conductors 51 and 51', contacts 52 and 52' with the primary winding 53 of the input transformer 54. The secondary winding 55 thereof is connected to ground and to the other terminal of the output transformer secondary winding 44. One of the arms of the switch 50 is connected by means of conductor 56 and through coupling condenser 57 to the grid 58 of the control tube 59. The cathode 60 thereof is grounded and the grid 58 connected through grid resistor 61 to a suitable tap on the voltage divider resistor 25.

The anode 62 of tubes 59 includes the inductance 63 tuned by condenser 64 in parallel therewith forming a tuned circuit which returns through conductors 65 to a suitable tap on the voltage divider 30. The output of the tube 59 is coupled to the input of the tube 66 by means of condenser 67, which connects the grid 68, the other having grid resistor 69 which returns through conductor 70 to the junction point of the grid return of tube 59 on the voltage divider 25. The cathode 71 of the tube 66 is also grounded. The tubes utilized here are also of the pentode type, and the screen grids 72 and 73 thereof return to the anode supply conductor 65 suitably bypassed by condensers 74 and 74'. The output circuit of tube 66 between anode 75 and cathode 71 includes the winding 76 of the relay 9, one terminal thereof being connected to the anode 75 and the other terminal to the anode supply conductor 65. A bypass condenser 77 is connected between anode 75 and ground.

Referring now to the input circuit of the amplifier, the input transformer 35 has a divided primary winding 78, one terminal of which through conductor 79 connects to two moving arms of a four-pole, double-throw switch 80. Another moving arm switch connects through conductor 81 to the tap 82 of the winding 78, whereas the other terminal thereof connects through conductor 83 to the remaining moving arm of the switch 80. Two contacts of the switch 80 in one position of the arm thereof connect through conductor 84 and 84' to a potentiometer 85, the resistance of which is in parallel with another winding 86 of the armature 87 of the vibration motor 46. The armature 87 is provided with suitable mechanical coupling means shown here in the form of a bar 87' for transmitting the vibratory motion to various specimens under fatigue tests. The other two contacts in the reverse position of the switch 80 connect through conductors 88 and 88' to contacts 89 and 89' of the switch 50.

The field winding 90 of the vibration motor 46 is paralleled by a field discharge resistor 91 and connects by means of switch 92 and series resistor 93 to a suitable direct-current potential source. A pilot light 94 is provided to indicate energization of the winding 90.

Describing the operation of the system herein disclosed, let it be assumed that the power switch 2 and the switch 92 are in closed position, whereby the necessary alternating and direct-current supply potentials are connected to the system. The amount of power expended in the field winding 90 can be controlled by the resistor 93, and the presence of field voltage across this winding is indicated by the pilot light 94. The resistor 91, as previously stated, limits excessive voltage across the field winding due to self-induction when the switch 92 is opened. During the operation of the equipment, it is desirable that the field winding 90 be operated at minimum value which will produce satisfactory output of the vibration motor 46. The application of alternating-current energizes also the audio frequency or beat frequency oscillator.

The output of the bias rectifier 18 is filtered by reactors 24 and 24', capacitors 26 and 26', and is impressed across voltage divider resistor 25. This provides proper bias for the operation of the vacuum tubes in the amplifier and frequency selective control tubes. The output of the rectifier tubes 15 and 15' is filtered by reactors 28 and 28', capacitors 29 and 29', and is impressed across the voltage divider 30. This supplies anode potential to the tubes aforementioned.

As shown in Fig. 1, switches 50 and 80 are closing in the position when the oscillator output is directly connected across the primary winding 78 of the input transformer 35. In this particular position, the amplifier is excited by the oscillator output voltage, and the amplifier output will energize the winding 45 of the vibration motor armature 87. The armature will vibrate at the frequency determined by the setting of the oscillator which may be varied between a wide range, as previously stated. The vibration motor will operate as long as switch 2 is closed, and thereby power will be delivered to the system. The opening of this switch can be manually effected by pressing button 7 or by energizing the winding 76 of the relay 9, which then opens the contact 8. The relay 9 is energized by current flow in the anode circuit of control tube 66. The operating potentials for tubes 59 and 66 are so chosen that sufficient negative bias is derived from the voltage divider 25 to bias their grids 58 and 68, respectively, to a practically cut-off point. The condition of bias so obtained can only be disturbed upon energization of the grid 58 through condenser 57 which is connected through conductor 56 to one arm of the switch 50. The latter in the position referred to is closing toward an open contact which leaves the grid circuit of the tube 59 free from energization.

When testing the fatigue characteristics of materials or mechanical systems, the oscillator output is slowly varied in frequency from a minimum to a maximum, or vice versa, and the test material put under vibratory tension over a range in frequency. At a particular frequency, it will be observed, usually by an audible indication, that the beat frequency and the natural period of vibration of the material under test coincide, in which case, the natural frequency of vibration should be maintained for the test, and the switches 50 and 80 may then be closed into the opposite position, as shown on the diagram. In this position, the output of the oscillator is connected to the primary winding 53 of the transformer 54. The secondary thereof is connected to the input circuit of tube 59 in series with the output transformer winding 44 and condenser 57. At the same time, the winding 86 is effectively connected between tap 82 and conductor 79 to a portion of the primary winding of input transformer 35. The movement of the armature 87 in the magnetic field produced by the winding 90 induces a voltage in the winding 86, which is now utilized to excite the input of the amplifier. The magnitude of voltage necessary for energizing the input of the amplifier may be determined by varying the potentiometer 85. The voltage so derived is alternating in character having a frequency corresponding to the natural frequency of vibration of the specimen, inasmuch as it is derived from the movement of the armature. The winding 86 is so connected with respect to phase relation to the input circuit of the amplifier that the voltage derived therefrom is regenerative; that is, in aiding phase relation with the voltage in the output circuit of the amplifier. The armature 87 will operate now with the excitation from the tubes 31, 31', the latter being entirely self-excited at the natural frequency of vibration of the specimen under test.

Under the above condition of operation, the oscillator, utilized to furnish a particular frequency which has a frequency component in the input circuit of the control tube 59, shall determine the action thereof to actuate the relay 9 in order to shut off the equipment and stop the operation thereof. It will be seen that the input circuit of the tube 59 includes not only the secondary winding 55 of the transformer 54, but also the secondary winding 44 of the amplifier output transformer. In other words, the input circuit of the tube 59 will be energized by an alternating current substantially equal to the natural frequency of vibration supplied from the winding 44 and also by an alternating current of a selective frequency supplied from the oscillator. The output circuit of the tube 59 is sharply tuned by the inductance 63 and condenser 64 to limit voltage transfer to the tube 66 at a particular predetermined frequency. When the oscillator frequency is so adjusted that the difference or the sum between its output frequency and that of the natural frequency of vibration gives the particular frequency determined by the tuned circuit comprising inductance 63 and condenser 64, the control tube 66 will become energized and operates through its output circuit, the relay 9 and the entire assembly will be immediately disconnected from the power circuit.

For the purpose of illustration and better understanding of the operation of the system, a concrete example may serve to illustrate the action of the automatic shut-off feature. Let it be assumed that the vibration motor is operating self-excited with the switches 50 and 80 in position B at a frequency of 50 cycles, this frequency being determined by the mechanical resonance of the system to which the vibration motor is connected. It is now desired to set up the equipment so that this self-excited oscillation will be maintained until the frequency drops, for example, to 45 cycles. The operating frequency of the control tubes 59 and 66 is determined entirely by the tube circuit comprising inductance 63 and condenser 64. Let it also be assumed that this circuit is resonant to a frequency of 61.7 cycles. Therefore, the relay 9 will operate when the difference in frequency between the vibration motor and the oscillator is 61.7 cycles. Now if the oscillator is adjusted to a frequency of 106.7 cycles, the difference in frequency between this figure and 45 cycles will be 61.7 cycles, and the condition for shutdown realized.

It is a fact generally well recognized that systems under vibratory tension will change in their natural frequency of vibration upon mechanical failure or structural changes in the material under test. The change usually is a lowering of natural periodicity of vibration. Even a few cycles deviation from the natural frequency indicates an incipient cause which will produce ultimate breakdown of the material. By the wide range whereby automatic shutdown of the fatigue testing equipment can be effected within a small deviation from the natural frequency enables observation of the material under test prior to such structural changes in its physical characteristics, which would otherwise could not be detected if the vibratory tension would be maintained until complete breakdown of the material under test.

Referring to Figs. 2 and 4, the vibration motor shown in perspective view and in cross section comprises the housing 95 in which is placed the field coil 90. Terminals 96 and 96' mounted on an insulating block 97 connect with leads 98 and 98' with the field coil 90. Fastened to the housing and concentrically arranged therewith is the core 99. Secured to the housing is the cover 100 which fits over the core through an opening in the housing of sufficient width as to leave room for the cylindrical armature 87 into which the core 99 loosely fits, allowing free coaxial motion of the armature with respect to the core. The armature 87 is supported by suspension from springs 101 which are secured to insulating supports 102 mounted on the cover 100. The armature 87 is provided with a cross piece 103 upon which is mounted a bar 87' or any suitable means for interconnecting the vibration motor armature with the particular specimen under test, thereby transmitting the motion of the armature to the test material. The windings on the armature 87 comprise two cylindrical coils 45 and 86 wound thereon. Each of these coils terminate respectively at two of the springs 101, as shown in the cross sectional view by connections 104 and 105. The springs 101 are provided with terminals 106 for the outside connection to the armature coils. Potentiometer 85 is connected across one of the coils as shown in Fig. 1. This coil generates the feedback voltage utilized in the system as previously described and the potentiometer serves as a voltage divider whereby the necessary amount of feedback voltage may be adjusted.

Fig. 3 shows, by way of example, the application of the vibration motor in testing the fatigue characteristics of overhead electrical conductors. The conductor under test is suspended between insulators, and artificial tension means are provided which are adjusted to simulate the stresses to which the wire is subjected in actual service. The bar 87' has a suitable opening through which the test wire passes. The apparatus is set into motion as described in connection with Fig. 1, the natural frequency of vibration of the wire being determined. The system is adjusted for automatic stopping within a few cycles of deviation of this natural frequency of vibration. Under such conditions before actual failure of the wire occurs, this may be inspected to determine the causes tending to produce the breaking of the wire. In this manner the causes can easily be determined and ways and means found to overcome such conditions which precipitate breaks or disintegration of the wire material under actual service.

The invention claimed is:

1. In an arrangement for testing vibration fatigue, a motor adapted to transmit vibratory motion to material to be tested, means for operating said motor in accordance with the natural frequency of vibration of said material including means for producing a voltage having said natural frequency, a control means for interrupting the operation of said motor, a source of periodic voltage, and means for actuating said control means in response to the beat frequency of the two said voltages.

2. In an arrangement for testing vibration fatigue, an electric motor for transmitting vibratory motion to a material to be tested, means for generating a voltage having a frequency corresponding to the natural frequency of vibration of said material, an oscillator having a frequency independent of the natural frequency of said material, a circuit energized at the beat frequency of said means for generating and said oscillator, and means responsive to a predetermined value of said beat frequency to deenergize said motor.

JOHN A. HUTCHESON.